United States Patent
Perry et al.

(10) Patent No.: US 7,979,662 B2
(45) Date of Patent: *Jul. 12, 2011

(54) STORAGE DEVICE WITH TRANSACTION INDEXING CAPABILITY

(75) Inventors: Nir Perry, Holon (IL); Polina Marimont, Modiin (IL); Alain Nochimowski, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 628 days.

This patent is subject to a terminal disclaimer.

(21) Appl. No.: 12/024,921

(22) Filed: Feb. 1, 2008

(65) Prior Publication Data

US 2009/0172307 A1    Jul. 2, 2009

Related U.S. Application Data

(63) Continuation-in-part of application No. 11/966,812, filed on Dec. 28, 2007.

(51) Int. Cl.
*G06F 12/00* (2006.01)
*G06F 13/00* (2006.01)
(52) U.S. Cl. .................. 711/170; 711/100; 711/154
(58) Field of Classification Search .................. 711/171, 711/172, 173, 100, 154, 170
See application file for complete search history.

(56) References Cited

U.S. PATENT DOCUMENTS

| | | | |
|---|---|---|---|
| 5,210,862 A | 5/1993 | DeAngelis et al. | |
| 5,226,153 A | 7/1993 | DeAngelis et al. | |
| 5,444,855 A | 8/1995 | Thompson | |
| 5,446,874 A * | 8/1995 | Waclawsky et al. | 714/1 |
| 5,471,462 A | 11/1995 | Amador | |
| 5,696,910 A | 12/1997 | Pawlowski | |
| 5,761,409 A | 6/1998 | Testardi | |
| 5,768,162 A | 6/1998 | Rupp et al. | |
| 5,905,738 A | 5/1999 | Whetsel | |
| 5,996,034 A | 11/1999 | Carter | |
| 6,105,087 A * | 8/2000 | Rivoir | 710/100 |
| 6,317,803 B1 | 11/2001 | Rasmussen et al. | |

(Continued)

FOREIGN PATENT DOCUMENTS

DE     10252278     5/2004

(Continued)

OTHER PUBLICATIONS

Tate Access Floors, Inc. v. Interface Architectural Resources, Inc.; United States Court of Appeals for the Federal Circuit; Feb. 7, 2002.*

(Continued)

*Primary Examiner* — Tuan V. Thai
(74) *Attorney, Agent, or Firm* — Beyer Law Group LLP (57) ABSTRACT

In one aspect, a system for indexing transactions over a plurality of communication lines is described. In various embodiments, the system includes a host controller and a plurality of storage devices in communication with one another. Each of the storage devices is configured to store data. The communication lines facilitate communications between the host controller and the plurality of storage devices. A selected one of the storage devices is configured to function as a transaction indexer to monitor the communication lines and index and store selected transaction information associated with operations that occur over the communication lines. While the host controller may be arranged to configure the transaction indexer, the transaction monitoring, indexing and storing are performed substantially automatically by the transaction indexer without requiring further instructions from the host controller.

73 Claims, 3 Drawing Sheets

U.S. PATENT DOCUMENTS

| | | | |
|---|---|---|---|
| 6,332,178 B1 * | 12/2001 | Dean et al. | 711/118 |
| 6,367,033 B1 * | 4/2002 | Jibbe | 714/37 |
| 6,624,830 B1 | 9/2003 | Beck et al. | |
| 6,697,900 B1 | 2/2004 | Hadley | |
| 6,839,771 B1 | 1/2005 | Bouchier et al. | |
| 6,912,673 B1 | 6/2005 | Wyland | |
| 7,024,508 B2 | 4/2006 | Gros et al. | |
| 7,103,805 B2 | 9/2006 | Belschner et al. | |
| 7,213,169 B2 | 5/2007 | Dodson et al. | |
| 7,231,483 B2 | 6/2007 | Gros et al. | |
| 7,302,616 B2 | 11/2007 | Dodson et al. | |
| 2002/0095593 A1 * | 7/2002 | Daniell et al. | 713/200 |
| 2003/0233601 A1 | 12/2003 | Vaid et al. | |
| 2004/0003327 A1 * | 1/2004 | Joshi et al. | 714/47 |
| 2004/0044639 A1 | 3/2004 | Schoenberg et al. | |
| 2004/0139264 A1 | 7/2004 | Gros et al. | |
| 2004/0148482 A1 * | 7/2004 | Grundy et al. | 711/167 |
| 2004/0153876 A1 | 8/2004 | Whetsel | |
| 2004/0153887 A1 | 8/2004 | Whetsel | |
| 2004/0186977 A1 * | 9/2004 | Helsley et al. | 711/217 |
| 2004/0199722 A1 | 10/2004 | Dodson et al. | |
| 2005/0094674 A1 | 5/2005 | Zinke et al. | |
| 2005/0102572 A1 | 5/2005 | Oberlaender | |
| 2005/0166098 A1 | 7/2005 | Davis | |
| 2006/0248409 A1 | 11/2006 | Baumann et al. | |
| 2007/0043881 A1 | 2/2007 | Li | |
| 2007/0073856 A1 * | 3/2007 | Tsien | 709/223 |
| 2007/0233933 A1 * | 10/2007 | Wang et al. | 711/100 |
| 2008/0140911 A1 * | 6/2008 | Pandya | 711/101 |
| 2008/0140917 A1 * | 6/2008 | Pandya | 711/103 |
| 2009/0049230 A1 * | 2/2009 | Pandya | 711/101 |
| 2009/0070530 A1 * | 3/2009 | Satoyama et al. | 711/114 |
| 2009/0150588 A1 * | 6/2009 | Wang et al. | 710/110 |
| 2010/0082893 A1 * | 4/2010 | Ma et al. | 711/103 |

FOREIGN PATENT DOCUMENTS

| | | | |
|---|---|---|---|
| JP | 56-92650 | | 7/1981 |
| JP | 63296542 A | * | 12/1988 |
| JP | 04239847 A | * | 8/1992 |
| JP | 8-263395 | | 10/1996 |
| JP | 2004214885 A | * | 7/2004 |
| WO | 2005/077057 | | 8/2005 |
| WO | 2007/009942 | | 1/2007 |
| WO | WO 2007040085 A1 | * | 4/2007 |

OTHER PUBLICATIONS

How to Retrieve the Real Hard Drive Serial Number; zeddy; The Code Project; Feb. 17, 2004.*

How to Map a Network Drive;vista4beginners.com; May 22, 2007.*

Front side bus definition; FOLDOC—Free Online Diction of Computing.*

"On Line" Error and Statistics Logging in Large Data Base Systems, IPCOM000087268D; Heimsoth et al.; IBM; Mar. 3, 2005.*

"Data Storage and Logger for CANopen Networks," http://www.ifm-electronic.com/ifmru/news/news_sys_52fc3c.htm.

Xu et al., "A 'Flight Data Recorder' for Enabling Full-system Multiprocessor Deterministic Replay," 30th Annual International Symposium on Computer Architecture (ISCA-30), Jun. 9-11, 2003.

* cited by examiner

STORAGE DEVICE WITH TRANSACTION INDEXING CAPABILITY

CROSS REFERENCE TO RELATED APPLICATIONS

This application is a Continuation in Part of U.S. patent application Ser. No. 11/966,812 filed on Dec. 28, 2007 and entitled "STORAGE DEVICE WITH TRANSACTION LOGGING CAPABILITY," which is incorporated herein by reference in its entirety.

FIELD OF THE INVENTION

The present invention relates generally to logging/indexing transactions conducted over communication lines. More particularly, a storage device is configured to also track transactions that occur over the communication lines.

BACKGROUND

It has become commonplace to connect a host processor to different devices using a plurality of conducting wires referred to as a "bus" that typically complies with well known standards. The devices connected to the bus may include memory/storage devices, communications devices, sensing devices, etc. and these devices may be either fixed or removable. In most situations, some or all of the wires that define the bus are shared amongst any and all of the devices that are connected to the bus. Since the devices coupled to the bus share the same conducting wires, each device is typically assigned a unique ID or address on the bus and is configured to respond only to messages that are addressed to that unique ID/address. In this way, multiple devices can share the same conducting wires that form the bus resulting in a substantially reduced bus size than would otherwise be required.

Some buses are designed for use by a particular class of devices such as memory (e.g., a memory bus), input/output devices (e.g. an I/O bus) or other types of peripheral devices. Other buses are designed for use by multiple types of devices. In some circumstances, it may be desirable to track transactions that occur over the bus. Such information may be useful for a number of purposes including memory usage profiling, background content indexing, and storage device diagnostics etc. The present invention proposes a new approach for tracking such transactions over a memory related bus arranged to support multiple memory devices.

SUMMARY OF THE DESCRIBED EMBODIMENTS

In one aspect, a system for indexing transactions over communication lines is described. In various embodiments, the system includes a host controller and a plurality of storage devices in communication with the communication lines. The communication lines facilitate communications between the host controller and the plurality of storage devices. Each of the storage devices is configured to store data. Additionally, at least a selected one of the storage devices is configured to function as a transaction indexer to monitor the communication lines and index and/or store selected transaction information associated with operations that occur over the communication lines. While the host controller may be arranged to configure the transaction indexer, the transaction monitoring, indexing and storing are performed substantially automatically by the transaction indexer without requiring further instructions from the host controller.

In another aspect, a transaction indexing storage device that is capable of performing such transaction indexing is described. The storage device includes at least one storage region configured to store data in a generally traditional manner. A protocol parser in the storage device is configured to analyze communications received over the communication lines and to determine if the communication is targeted to the storage device. A controller within the storage device is configured to perform operations in the storage region in response to a communication if the communication is targeted to the storage device. The storage device further includes a protocol logger for monitoring the communication lines and for indexing and/or storing selected transaction information associated with the operation regardless of whether or not the communication is addressed to the storage device and regardless of whether or not the operation is performed by the transaction indexing storage device.

In yet another aspect, a method is described for indexing transactions in a system having an architecture such as that described above using a transaction indexing storage device such as that just described. The method includes receiving a communication associated with an operation over the communication lines. Selected transaction information associated with the operation is indexed and/or stored (logged) by the storage device. The transaction information is stored within a transaction indexing region of the storage device. The storage device is arranged to index and/or store transaction information associated with operations that occur over the communication lines without requiring further instructions from an external host device and regardless of whether the operation is targeted to or performed by the storage device.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE DESCRIBED EMBODIMENTS

Reference will now be made in detail to particular embodiments of the invention, examples of which are illustrated in the accompanying drawings. While the invention will be described in conjunction with the following particular embodiments, it will be understood that they are not intended to limit the invention to the described embodiments. To the contrary, the described embodiments are intended to cover alternatives, modifications, and equivalents as may be included within the spirit and scope of the invention as defined by the appended claims.

Aspects of the present invention describe a device, system and method for indexing transactions conducted over communication lines that couple one or more storage devices with a host controller. Particular embodiments of the invention are discussed below with reference to FIGS. 1 through 3. The following description focuses on embodiments in which the storage devices are interconnected via a memory/storage related bus and in which transactions conducted over the bus are monitored and indexed. However, those skilled in the art will readily appreciate that the detailed description given herein with respect to these figures is for explanatory purposes as the invention extends beyond these limited embodiments. By way of example, in an alternate embodiment, the storage devices are not interconnected with a bus architecture; rather, each device is connected only with its neighboring devices.

Figure 1:
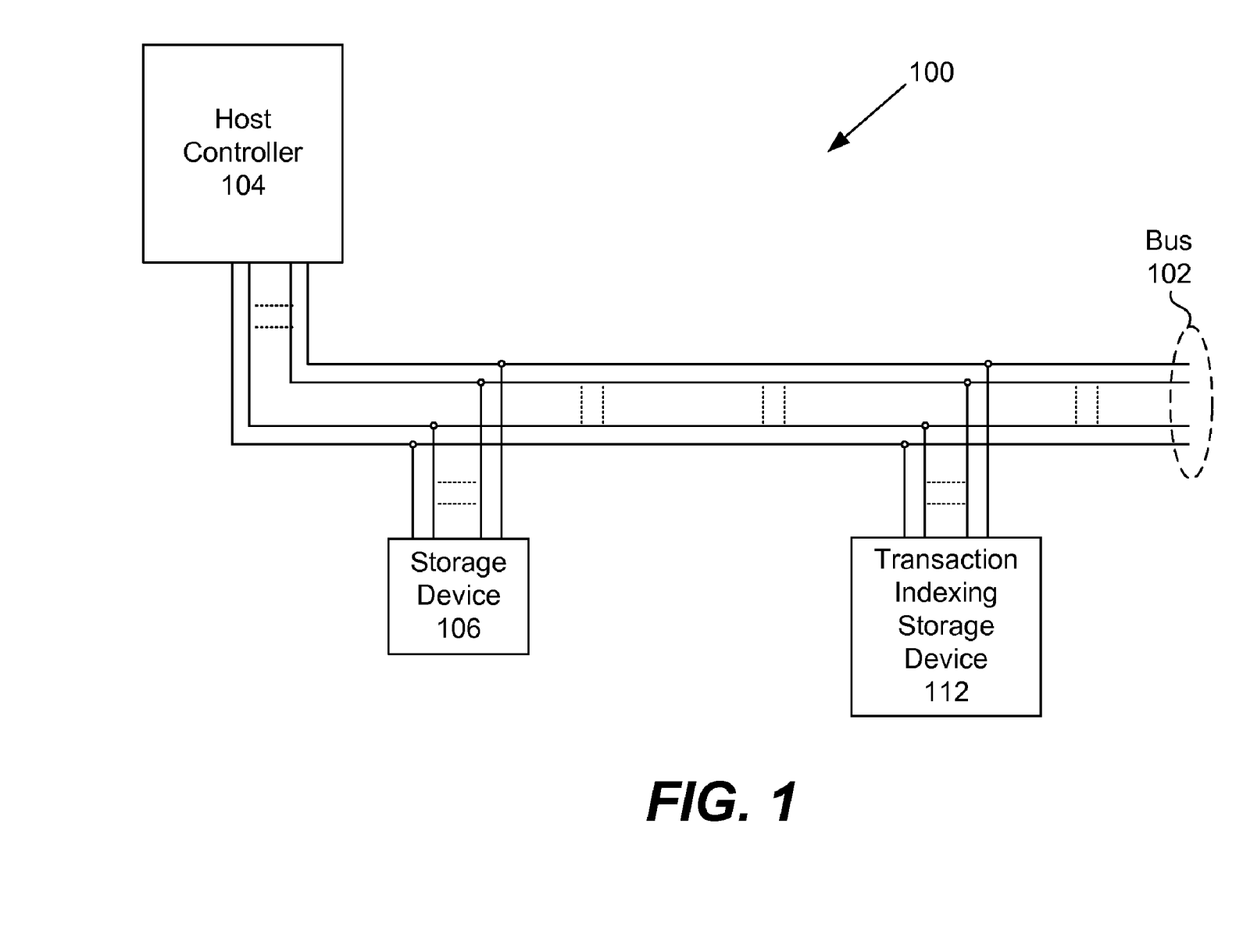
FIG. 1 illustrates a simplified block diagram of a system in accordance with an embodiment of the present invention.

FIG. 1 illustrates a simplified block diagram of a system 100 in accordance with one embodiment of the present invention. The system 100 includes a number of communication or signal lines 102 (referred to as bus 102) used to connect a host controller 104 with peripheral storage devices 106 and 112. It should be noted that even though only two peripheral storage devices are shown, more or fewer storage devices can readily be coupled to the bus 102. The actual number of signal lines that constitute the bus 102 may also be widely varied. By way of example, some modern buses have a relatively small number of signal lines (e.g. 8-16 signal lines), while other modern buses may have over 100 lines that may themselves be logically divided into subsets of lines that effectively act as sub-buses (e.g., an address bus, a control bus, a data bus, etc.).

In the illustrated embodiment, the bus 102 is a memory bus and each of the peripheral devices 106 and 112 is a storage device suitable for storing data. Although it is contemplated that any suitable storage devices may be used, in the following description of particular embodiments, the storage devices 106 and 112 are non-volatile storage devices. By way of example, the non-volatile storage devices may be FLASH or EEPROM based storage devices. The storage devices 106 and 112 may either be removable or non-removable (fixed) devices. As is well known, non-removable devices are not intended for subsequent removal from the bus once they have been connected with the bus whereas removable devices are configured so as to be readily removed or added to the bus. Generally, it is preferred that storage device 106 be removable, while storage device 112 is fixed.

One type of removable device that is well suited for use as storage device 106 is a memory card. Memory cards are commonly used to store digital data for use with various electronics products. The memory card is often removable from the electronic system so the stored digital data is portable. The memory cards can have a relatively small form factor and be used to store digital data for electronics products that acquire data, such as cameras, media players/recorders (e.g., MP3 devices), hand-held or notebook computers, personal digital assistants (PDAs), cellular phones, network cards, network appliances, set-top boxes, and hand-held or other devices.

Each storage device typically includes a corresponding unique and permanent device identifier. In some bus protocols, the permanent device identifier is used to identify the device in bus communications. In other protocols, the host controller will assign a temporary device identifier and/or an associated set of addresses to each of the devices coupled to the bus. Typically, such temporary device identifiers and/or addresses are assigned upon connection and initialization of the respective storage device 106 or 112 with the bus 102 and host controller 104, or in the case of a removable memory card, upon insertion of the card into an associated card reader. Although the specifics of the bus protocol and the memory management protocol will vary based on the nature of the particular bus and storage devices employed, the host controller 104 is typically aware of each storage device's respective device identifier(s).

Typically, a specific device attached to the bus 102 will know whether it is supposed to respond to a particular communication or command based upon the communication sent from the host 104, which typically uses device identifiers and/or addresses in targeting communications/commands to specific storage devices. That is, in some protocols, each communication will generally include a device identifier that informs the storage devices whether or not they are the target of the communication. In other protocols, the device identifier is not explicitly sent as part of each memory related communication. Rather, the command may identify an address to which the command (e.g., a read, write or erase command) is addressed. In general, devices that are not identified or addressed by the communication will simply ignore the communication.

In the illustrated embodiment, the communications are sent over the shared bus 102 to the storage devices according to a suitable bus protocol. The bus protocol specifies how information is communicated over the bus. By way of example, suitable bus protocols include the Secure Digital Card (SD) protocol, the Multi Media Card (MMC) protocol and the Universal Serial Bus (USB) protocol, although a wide variety of other bus protocols may be used as well. The storage devices 106 and 112 may also be configured to send communications over the bus 102 to the host 104 and in some embodiments, to other devices as well. However, in various embodiments, the host 104 and storage device 106 and 112 have a master/slave type of an arrangement in which the host is the master and the storage device are slaves that have reduced abilities to send communications.

As will be appreciated by those familiar with the art, current storage devices employ a wide variety of different architectures and it is expected that new architectures will continue to be developed. In general, the present invention may be employed in conjunction with a wide variety of different types of memory, so long as the storage device has suitable processing power.

Figure 2:
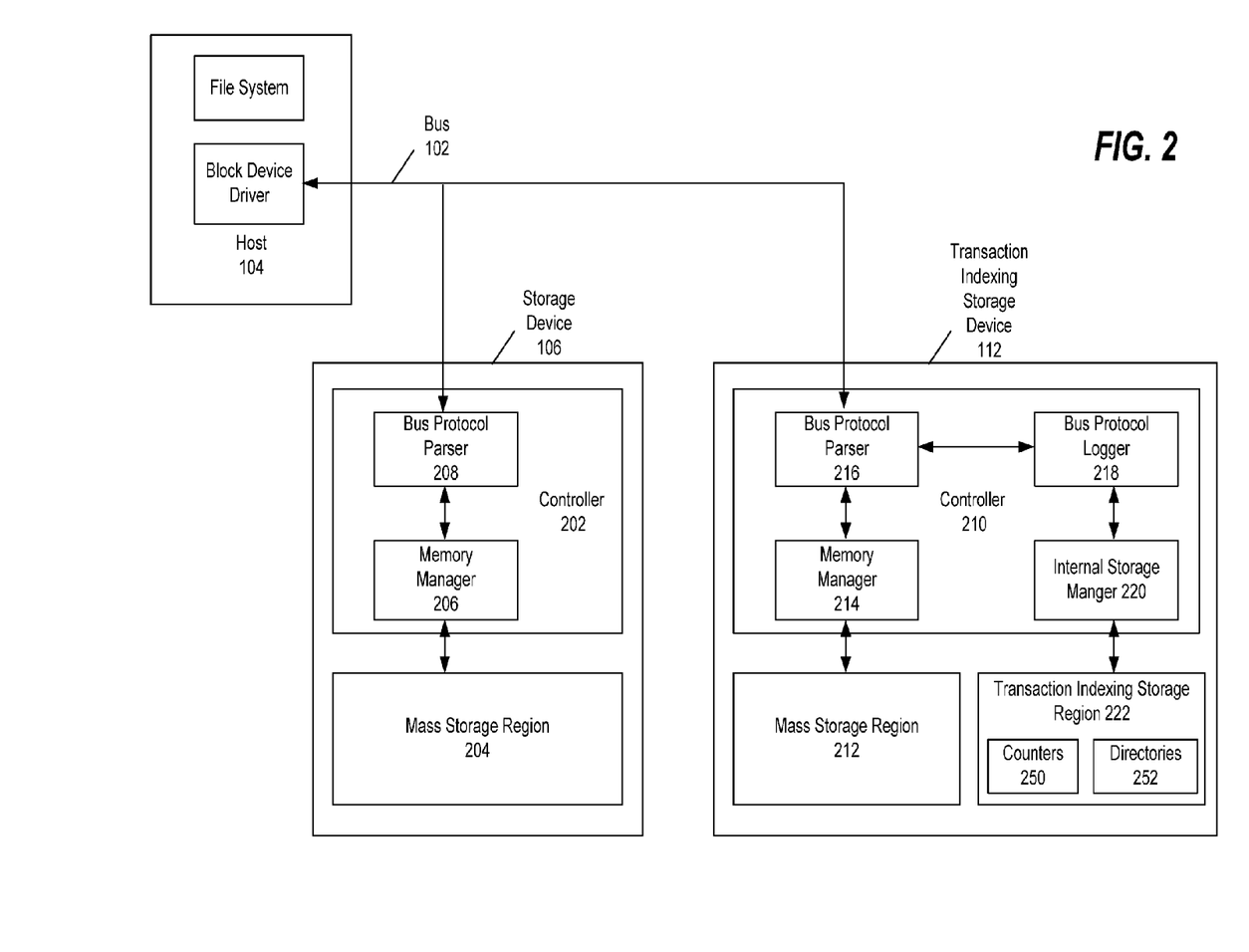
FIG. 2 illustrates simplified block diagrams of example storage devices in accordance with an embodiment of the present invention.

FIG. 2 is a block diagram that illustrates the structure of each of the storage devices 106 and 112 in accordance with one embodiment of the present invention in more detail. In general, storage device 106 is a conventional storage device, whereas, in a preferred embodiment, storage device 112 is configured both to act as an addressable mass storage device and to automatically log transaction information related to operations that occur on the bus 102. The storage device 112 may be a specialized device preconfigured with this dual functionality or a device that has been configured (such as by the host 104) to include this dual functionality. However, in an alternate embodiment, the storage device 112 may be a storage device that has been configured solely to log transaction information.

The transaction indexing storage device 112 is arranged to track bus operations regardless of whether it is the target of such operations. As such it is able to log transaction information that is relevant to other devices connected to the bus (e.g., storage device 106) in addition to its own activities. As will be described in more detail below, the transaction indexing storage device 112 performs its logging operations without direct and recurring instructions from the host 104 or from any other device. That is, although the host controller 104 may frequently be used to configure the transaction indexing storage device 112, once it is configured, the transaction indexing storage device 112 is preferably arranged to monitor, index and store selected transaction information substantially autonomously and automatically without other further specific instructions from the host controller 104.

As previously mentioned, the storage device 106 may be either a removable or non-removable device. In the illustrated embodiment, the storage device 106 is a conventional removable FLASH memory card and generally includes a memory controller 202 and a mass storage region 204. The memory controller 202 includes a memory manager 206 and protocol parser 208.

As will be understood by those familiar with the art, the protocol parser 208 is configured to analyze communications sent over the bus 102. More specifically, the protocol parser 208 is configured to analyze a communication sent from host controller 104 and determine whether storage device 106 is an intended target of the bus communication based on a device identifier or address specified as part of the communication. If the bus communication is a memory operation directed towards storage device 106, the communication is passed to the memory manager 206 which in turn performs the requested operation accessing mass storage region 204. Other instructions directed at the storage device 106 are responded to by either the protocol parser 208 or the memory manager 206 as appropriate. Instructions and communications directed at other devices (e.g. storage device 112 or the host 104) are generally simply ignored by storage device 106.

In the embodiment illustrated in FIG. 2, transaction indexing storage device 112 is a non-removable component. That is, storage device 112 is a permanent part of the system that is generally not ever disconnected from bus 102. However, it should be understood that this is not a requirement and that in some alternative embodiments, storage device 112 may be configured as a removable device. Storage device 112 functions similarly to storage device 106 in that it is configured to perform memory operations and generally includes conventional memory components such as controller 210, a mass storage region 212, a memory manager 214 and a protocol parser 216. However, storage device 112 is further configured for use as a transaction logger/indexer for logging transaction related information associated with operations occurring over bus 102. As such, it logs and/or indexes selected bus transactions and activities, regardless of whether those transactions are directed at the transaction indexing storage device 112 or another device sharing the bus 102 (e.g. storage device 106). To facilitate this, transaction indexing storage device 112 further includes a bus protocol logger 218.

As mentioned above, protocol parsers in conventional storage devices are generally arranged to monitor communications sent over bus 102 and to only pass along commands to the associated memory manager that are directed to that particular storage device. Protocol parser 216 also monitors communications sent over the bus 102 and does the same in passing relevant commands directed at storage device 112 to its associated mass memory manager 214. Additionally, protocol parser 216 is arranged to communicate all of the received bus operations (or at least all of the operations of interest) to the bus protocol logger 218. The protocol logger 218, in turn, performs the desired logging operations and any desired processing related to the logging or indexing of the received bus operation. Of importance, the protocol parser 216 is arranged to direct all relevant bus operations to the bus protocol logger, regardless of whether the operation is directed at storage device 112 or to one of the other devices coupled to the bus 102. In this way, the transaction indexing storage device 112 can track the operations performed or to be performed by any of the devices sharing the bus 102, not just the operations that transaction indexing storage device 112 performs itself.

Although the protocol parser 216 is arranged to transmit all of the bus operations to the protocol logger 218, it does not necessarily transmit all of the contents of all of the received bus information to the protocol logger. Rather, the protocol parser 216 may be arranged to strip certain information that is not of interest to the protocol logger from the communications associated with each operation. For example, in a memory read or write operation, the protocol parser may strip the data associated with the read or write operation but pass along the device identifier or address to the protocol logger 218.

In the initial implementation described above, the protocol parser 216 is arranged to transmit all of the bus operations to the protocol logger 218. However, this is not a requirement. Rather, in some implementations it may be desirable to only track information about a subset of the types of operations that may occur on the bus 102. In such implementations, the protocol parser 216 may be arranged to only pass the bus operations of interest to the protocol logger 218. That is, the protocol parser 216 would effectively filter bus operations that are not of interest to the protocol logger 218. For example, if the protocol logger 218 is configured to log write operations, but is not interested in tracking read operations, then the protocol parser 216 may be arranged to pass information associated with write operations to the protocol logger and not pass information associated with read operations to the protocol logger. Subsequently, the protocol logger 218 may perform a second pass of filtering or sorting to select, index and store information of interest. Alternatively, the protocol parser may be arranged to transmit all of the bus operations to the protocol logger 218. In this embodiment, the protocol logger 218 performs all of the filtering of the bus operations and only indexes and stores information of interest.

In the illustrated embodiment, transaction indexing storage device 112 includes an internal storage manager 220 configured to store the transaction information within an additional transaction indexing storage region 222. The transaction indexing storage region 222 may be distinct from general mass memory storage region 204 either physically or by partitioning, or it may be a part or section of the general memory storage region 204. In other words, the indexing storage region 222 and general memory storage region may be a part of the same memory array.

As previously mentioned, the protocol logger 218 is arranged to log selected operations/transactions that occur on the bus 102. The protocol logger 218 is also arranged to intelligently sort, process, filter and/or index the information about the monitored transactions. The transaction information stored by the transaction indexing storage device 112 can vary widely depending on the needs of a particular application.

In one simple implementation, the protocol logger 218 is arranged to log selected information about every transaction that occurs on the bus 102. For example, the protocol logger 218 may be arranged to store the following entries for each sensed bus transaction: a storage device identifier that identifies the target (source) storage device; an operation identifier that identifies the type of operation performed; a timestamp indicative of the time that the operation occurred; and, selected transaction information that is based on the nature of the operation. As will be described in more detail below, this information can be useful for a number of purposes.

In embodiments where at least one of the storage devices is removable, the storage device identifier is preferably a permanent device identifier associated with the targeted storage device. As will be familiar to those skilled in the art, many types of storage devices such as FLASH memory cards have an associated permanent device identifier that may be used for this purpose. However, in embodiments that utilize storage devices that do not include permanent device identifiers, a device identifier assigned by the host controller may be used. Here it should be noted that in some cases, a single physical device may include two or more addressable storage regions (or devices) within the physical device. In this case, each storage region may have a corresponding device identifier and/or set of logical addresses and each may be tracked separately by the protocol logger 218. Additionally, if a particular command is addressed to all storage devices on the bus 102, then either a broadcast identifier that indicates that the command was addressed to all devices on the bus, or a list of all of the targeted device identifiers may be used. If the particular operation originates from a storage device (such as an interrupt, an initialization request, an acknowledgement, etc.), then the storage device identifier would identify the source of the operation.

The operation identifier identifies the type of bus protocol operation performed. The identified operations may be memory operations such as read, write and erase operations; memory management commands such as an instruction for a targeted storage device to create a partition; initialization and authentication requests; interrupts; acknowledgements; error signals and any other bus related commands or operations.

The timestamp provides temporal information indicative of when the transaction occurred. The transaction indexing storage device 112 may include its own clock so that the timestamp can be generated internally rather than requiring communication from the host controller 104.

The transaction information that is stored will vary depending upon the nature of the bus operation that is being logged and the level of detail desired for that particular operation. Often, the transaction information will include various forms of context information. For example, when the operation is a write operation, the context information may include, the file name (i.e., the name of the stored object), the file type and/or the file size. In bus protocols that support different priority levels for different events, commands or operations, the transaction or context information may also include a priority identifier that is indicative of the priority level assigned to the operation. If the bus protocol supports error signals with accompanying details indicative of the nature of the error, then the context information may include the accompanying error identifier or other appropriate details about the nature of the error. Additionally, in bus protocols supporting different security levels for different operations, the context information may include the level of security associated with a particular bus operation. The context information may further include the level of immunity to power failure of a particular device. By way of example, when bus operations involve the transfer of sensitive data, it may be desirable to note the level of power failure immunity of the associated storage device involved in the transfer of the sensate data. As will be appreciated by those familiar with the art, a wide variety of other context information may be appropriate to store for specific bus operations.

In addition to simply logging selected information that can be readily taken from bus signals, the protocol logger 218 is also preferably designed to perform some level of processing of the received information in order to record information that might be more useful for a user. One simple type of transaction processing uses counters to track the frequency or total number of specific operations that are performed. Such tracking can be used for a variety of purposes including diagnostics, usage profiling and wear monitoring. For example, one well known issue for flash memory is that the reliability of the device tends to deteriorate after extensive use. Therefore, for management purposes it is helpful to know the number of write operations that have been performed on any particular flash device. Such information can readily be tracked by the protocol logger 218.

In the illustrated embodiment, the protocol logger 218 maintains a counter 250 for each storage device that is, or has been connected to the network. Each time a write operation is directed at a specific storage device on the bus 102, the associated counter is incremented by one. In this way, the counter maintains an accurate count of the total number of write operations that have been directed to the specific storage device. The protocol logger 218 may then be queried by an application (which may be running on the host controller 104) to provide the write count associated with one or more of the write counters. Thus, the counter may effectively be used to gauge wear in a FLASH device or other storage device.

It should be appreciated that this type of wear gauge or write counter can be readily implemented since the protocol logger 218 is informed each time a write operation occurs on the bus 102 and the protocol logger knows the identity of the targeted storage device. Therefore, any time it detects a write operation directed to a specific storage device, it simply increments the write counter associated with the specific storage device. If desired, the counter can also be incremented each time an erase command is transmitted to the associated device or a separate erase counter can be provided. The write counting feature works well even when the associated storage device is a removable storage device because a separate counter may be associated with each distinct device. When a new storage device is installed or first written to, a new counter can be initiated and associated with the new device. Counters can be used to track any other desired type of operation as well. For example, read counters may be provided to track read operations; error counters can be provided to track error messages or particular types of error messages; etc.

Another indexing function that may be performed by the protocol logger 218 is the creation and maintenance of a directory for each storage device. The directory identifies each of the files stored on a particular storage device. Again, this functionality can readily be performed by the protocol logger 218 based on information that is available to it on the bus 102. Specifically, in some bus protocols, when a file is written to a particular storage device, the file name and associated information such as the file type and file size may be included as part of the write command. In such systems, the protocol logger 218 can be configured to take advantage of this information to create directories (e.g. file lists) 252 for each of the storage devices that are (or have been) coupled to the bus 102. The directories 252 are maintained in the indexing storage region 222 of indexing storage device 112. Like the counters 250, the directories 252 can be created either when a particular storage device is first registered on the bus 102, or when a write operation is first directed towards the particular storage device.

The file directory feature has a number of potentially useful applications. One such application is in environments where the invention is used in conjunction with a consumer product having a memory card connector that permits flash (or other non-volatile memory) cards to be inserted into the connector to operate as storage device 106. When such devices are used, it is often expected that many different portable storage devices (e.g. memory cards) may be used in connection with the drive and that different files (which may be pictures, music, video, documents or other types of files) will be stored on different portable memory cards. One difficulty that is sometime encountered by users of such removable storage devices is that they may forget which memory card a particular file is stored on. When the described directories are maintained by the transaction indexing storage device 112, the consumers can query the protocol logger 218 through an application, which may be provided on the host device 104 for example, to determine what memory card (storage device) a desired file is located on. It should be noted that the particular memory card onto which the lost file was written does not have to be connected with the bus 102 in order to determine its location. This is because the directory is stored on a device permanently connected to the bus (i.e., within the transaction indexing storage region 222 of the transaction indexing storage device 112).

The foregoing description, for purposes of explanation, used specific examples to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

For instance, although only a few forms of transaction information and transaction indexing functions have been described, it will be appreciated that additional forms and uses of transaction information fall within the scope of the invention. By way of example, in some embodiments the indexed transaction information may be intelligently utilized to increase the efficiency or otherwise improve the management capabilities of the memory manager 214 or other memory components of transaction indexing storage device 112. Furthermore, selected transaction information may be extracted and subsequently utilized to improve the performance of storage device 106 or any other device connected with the bus 102. More particularly, transaction information may be mined to find and/or eliminate redundancy in file storage or to more evenly distribute file storage within a memory array of a device to prolong the life of the storage device by preventing overuse and wear of specific memory locations within a memory array.

Additionally, although the foregoing description has been described with reference to an embodiment in which a single transaction indexing storage device is coupled with the bus, it should be appreciated that any number of the storage devices coupled to the bus may be configured as transaction indexing storage devices. While one or more of the transaction indexing storage devices may be dedicated devices permanently coupled with the bus, other transaction indexing storage devices may be removable devices. Furthermore, while some of the transaction indexing storage devices (e.g., the permanent dedicated devices) may be configured solely for use in transaction indexing, other transaction indexing storage devices may be configured for both mass storage as well as transaction indexing.

Moreover, although the foregoing description has been described in terms of a particular bus/device configuration, in alternate embodiments the storage devices may be connected in other suitable configurations or arrangements. By way of example, in the embodiment illustrated in FIG. 3, each device, including storage devices 306, 308 and 312, is connected serially in a daisy chain arrangement. Such an arrangement may be desirable in various high speed consumer electronics applications, among others. Although only three storage devices are shown in the embodiment illustrated in FIG. 3, it will be appreciated that more or fewer devices may be arranged in the daisy chain arrangement. In general, two to five devices are typically connected in such an arrangement.

Figure 3:
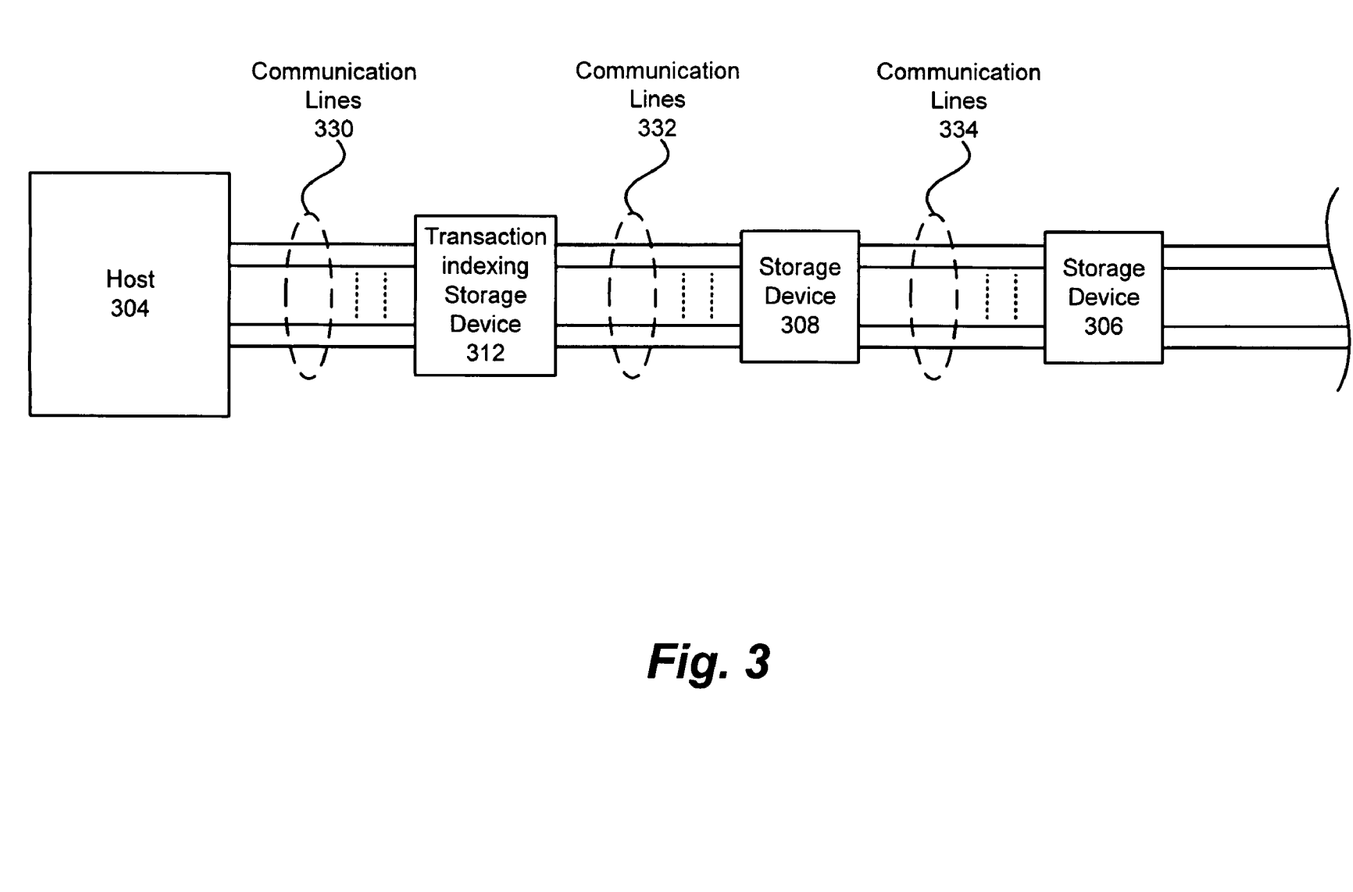
FIG. 3 illustrates a simplified block diagram of a system including a plurality of storage devices arranged into a daisy chain configuration in accordance with an embodiment of the present invention.

By daisy chain arrangement, it is meant that pins of one device are electrically connected to pins of a neighboring device. The connection can be either by hard soldering, by a printed circuit layout or by connection of socket pins. For example, a second set of pins from transaction indexing storage device 312 can be connected to a first set of pins from storage device 308 via a set of communication lines 332, a second set of pins of storage device 308 can be connected to a first set of pins of storage device 306 via a set of communication lines 334, and so on. In this way, all of the storage devices other than the first and last device in the daisy chain arrangement are connected to two immediately adjacent neighboring devices. Unlike the other storage devices, however, the first set of pins of transaction indexing storage device 312 are connected via a set of communication lines 330 with host controller 304. In one embodiment, all of the storage devices share a clock; however, this is not a requirement as each device may generate its own clock.

In the illustrated embodiment, there is no common bus that interconnects the storage devices 306, 308 and 312 with one another and to the host 304. Rather, in this configuration, each device passes to the next device downstream in the chain the commands from the host 304 that are not addressed to itself. That is, each storage device (e.g., storage devices 306 and 308) other than the first device in the chain (e.g., transaction indexing storing device 312) is coupled to the host 304 by means of any upstream devices in the chain. That is, all communications or information passed from the host 304 to a particular storage device must first pass sequentially through all other upstream devices in the chain. In effect, the storage devices 306, 308 and 312 along with communication lines 330, 332 and 334 form a virtual communication bus that serves to pass communications and information from the host to the storage devices and from the storage devices to the host. It should be noted that in this embodiment, in order to index the relevant transaction information pertaining to specific devices, the transaction indexing storage device 312 is located in the chain before the specific devices the transaction indexing storage device is interested in monitoring. In this way, the transaction indexing storage device 312 is capable of observing and indexing the relevant information associated with all communications and/or operations transmitted through transaction indexing storage device 312 downstream to the other devices in the chain targeted by the communications as well as all responses and/or operations transmitted upstream from the other devices in the chain through the transaction indexing storage device 312 to the host 304. In one preferred embodiment, the transaction indexing storage device 312 is the first device in the chain and is connected with the host 304 via communication lines 330.

In still other embodiments, the storage devices 306, 308 and 312 could be arranged into a daisy chain configuration as in FIG. 3, while a separate common bus interconnects the storage devices with themselves and to the host 304. In this way, unlike conventional arrangements, the signal or communication path between the daisy chained devices is separate and distinct from a bus and therefore, again unlike conventional approaches, does not consume bus resources that could otherwise be used to pass information and/or data between the storage devices and host controller 304. A more detailed description of such a daisy chain arrangement can be found in copending application Ser. No. 11/927,108 filed on Oct. 29, 2007 and entitled, "ADDRESSING MULTIPLE DEVICES ON A SHARED BUS," which claims priority from provisional application No. 60/979,372 filed on Oct. 11, 2007 and entitled "ADDRESSING AN ADDRESS-LESS DEVICE ON A SHARED BUS;" and copending application Ser. No. 11/928,110 filed Oct. 30, 2007 and entitled "SIGNALING AN INTERRUPT REQUEST THROUGH DAISY CHAINED DEVICES," which claims priority from provisional application No. 60/981,772 filed on Oct. 22, 2007 and entitled "SIGNALING AN INTERRUPT REQUEST THROUGH DAISY CHAINED DEVICES;" all of which are hereby incorporated by reference herein in their entirety for all purposes. In these embodiments, the transaction indexing storage device 312 is preferably the first device in the chain and is configured both to monitor transactions that occur over the bus as well as communications passed through the transaction indexing storage device downstream to other devices via communication lines 332.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A system for indexing transactions, the system comprising:
   a host controller;
   a plurality of addressable storage devices, each of the storage devices being configured to store data and each being addressable by said host controller over said communication lines;
   a plurality of communication lines that couple the host controller and each of the plurality of storage devices to facilitate communications between the host controller and the plurality of storage devices; and
   wherein a selected one of the storage devices is configured to function as a transaction indexer that monitors at least some of the communication lines and stores selected transaction information associated with operations that occur over the monitored communication lines, and wherein said selected transaction information is stored upon said selected one of said storage devices.

2. A system as recited in claim 1, wherein the plurality of addressable storage devices are arranged in a daisy chain configuration such that each of the plurality of addressable storage devices is connected with at least one neighboring storage device via one or more of the communication lines, wherein each storage device is connected with no more than two immediately adjacent neighboring storage devices, wherein each storage device other than the last storage device in the chain passes communications that are not targeted to itself to the next storage device in the chain via the communication lines that connect neighboring storage devices with one another, and wherein said selected storage device is located in said daisy chain configuration before other of said addressable storage devices.

3. A system as recited in claim 2, wherein the plurality of addressable storage devices are not interconnected with a bus and wherein each storage device is only in direct communication with its immediately adjacent neighboring storage devices.

4. A system as recited in claim 2, wherein the selected storage device is configured to monitor and store selected transaction information associated with operations that occur over the monitored communication lines associated with storage devices downstream in the chain on the opposite side of the selected storage device as the host controller.

5. A system as recited in claim 4, wherein the selected storage device is the first storage device in the chain and is connected with the host controller.

6. A system as recited in claim 1, wherein the host controller is arranged to configure the transaction indexer, but the communication line monitoring and storing are performed substantially automatically by the transaction indexer without requiring further instructions from the host controller.

7. A system as recited in claim 1, wherein the selected storage device includes at least two storage regions, wherein a first one of the regions is reserved for use by the transaction indexer for storing the selected transaction information and wherein a separate second region is reserved for storing other data that is not transaction information.

8. A system as recited in claim 1, wherein the selected storage device is a dedicated non-removable device that is not intended for removal from the communication lines.

9. A system as recited in claim 1, wherein at least one of the plurality of storage devices is a removable device configured for ready removal from and addition to various communication lines.

10. A system as recited in claim 1, wherein the selected storage device is further configured to selectively filter and sort the transaction information and to store only selected transaction information.

11. A system as recited in claim 1, wherein the selected storage device is further configured to selectively process the transaction information prior to storing the transaction information.

12. A system as recited in claim 1, said system further comprising:
    a counter associated with a second one of said storage devices, wherein the selected storage device is further configured to increment said counter regarding a particular element of the transaction information from said second storage device.

13. A system as recited in claim 1, wherein the operations include initialization commands, authentication requests, interrupt requests, acknowledgements or error signals.

14. A system as recited in claim 1, wherein the operations include memory operations and wherein the transaction information can be associated with memory operations that occur over the communication lines.

15. A system as recited in claim 14, wherein the memory operations include read operations, write operations and erase operations.

16. A system as recited in claim 1, wherein the transaction information includes an operation identifier that identifies a type of a particular operation performed.

17. A system as recited in claim 1, wherein the transaction information includes a permanent device identifier associated with the particular storage device corresponding to a particular operation.

18. A system as recited in claim 1, wherein the transaction information includes a temporarily assigned device identifier associated with the particular storage device corresponding to a particular operation.

19. A system as recited in claim 1, wherein the transaction information includes a logical address associated with a particular operation.

20. A system as recited in claim 1, wherein the transaction information includes a timestamp associated with a particular operation.

21. A system as recited in claim 1, wherein the transaction information includes context information related to a particular operation.

22. A system as recited in claim 21, wherein the context information includes at least one of a file name, a file type and a file size associated with the operation.

23. A system as recited in claim 21, wherein the context information includes at least one of a level of priority associated with a particular operation, a level of security associated with a particular operation and a level of power failure immunity associated with a particular operation.

24. A system as recited in claim 1, wherein the transaction information associated with a particular operation includes at least a device identifier, an operation identifier and a timestamp.

25. A system as recited in claim 1, wherein the selected storage device includes a protocol parser for analyzing a communication received over the memory bus and for determining if the communication is targeted at the selected storage device.

26. A system as recited in claim 25 wherein the selected storage device includes a controller for performing a memory operation in a mass storage region within the selected storage device in response to the communication if the communication is targeted at the storage device.

27. A system as recited in claim 1, wherein two or more of the addressable storage devices are each configured to function as a transaction indexer that monitors the communication lines and stores selected transaction information associated with operations that occur over the communication lines.

28. A system as recited in claim 1, wherein the selected addressable storage device is configured to function as both a mass storage device and a transaction indexer that monitors the communication lines and stores selected transaction information associated with operations that occur over the communication lines.

29. A system as recited in claim 1, wherein the selected addressable storage device can be queried by an application to provide selected stored transaction information.

30. A transaction indexing storage device configured for connection with one or more communication lines, the transaction indexing storage device comprising:
   at least one mass storage region configured to store data;
   a protocol parser coupled to the storage device for analyzing a communication received over the communication lines and for determining if the communication is targeted at the storage device;
   a controller for performing an operation in response to the communication if the communication is targeted at the storage device; and
   a protocol logger configured to monitor the communication lines and store selected transaction information associated with the communication regardless of whether or not the communication is targeted at the storage device and regardless of whether or not the operation is performed by the storage device.

31. A transaction indexing storage device as recited in claim 30, wherein the storage device is in communication with a host controller via the communication lines, wherein the host controller is arranged to configure the storage device, but the communication line monitoring and storing are performed substantially automatically by the transaction indexing storage device without requiring further instructions from the host controller.

32. A transaction indexing storage device as recited in claim 30, wherein the storage device includes at least two storage regions, wherein a first one of the regions is reserved for use by the protocol logger for storing the selected transaction information and wherein a separate second region is reserved for storing other data that is not transaction information.

33. A transaction indexing storage device as recited in claim 30, wherein the storage device is a dedicated non-removable device that is not intended for removal from the communication lines.

34. A transaction indexing storage device as recited in claim 30, wherein the storage device is further configured to selectively filter and sort the transaction information and to store only selected transaction information.

35. A transaction indexing storage device as recited in claim 30, wherein the storage device is further configured to selectively process the transaction information prior to storing the transaction information.

36. A transaction indexing storage device as recited in claim 30, said transaction indexing storage device further comprising:
   a counter associated with a second storage device connected with said memory bus, wherein the transaction indexing storage device is further configured to increment said counter regarding a particular element of the transaction information from said second storage device.

37. A transaction indexing storage device as recited in claim 30, wherein the operation includes an initialization command, an authentication request, an interrupt request, an acknowledgement or an error signal.

38. A transaction indexing storage device as recited in claim 30, wherein the operation is a memory operation and wherein the transaction information is associated with the memory operation that occurs over the communication lines.

39. A transaction indexing storage device as recited in claim 38, wherein the memory operation is a read operation, write operation or erase operation.

40. A transaction indexing storage device as recited in claim 30, wherein the transaction information includes an operation identifier that identifies a type of a the operation.

41. A transaction indexing storage device as recited in claim 30, wherein the transaction information includes a permanent device identifier associated with a particular storage device corresponding to the operation.

42. A transaction indexing storage device as recited in claim 30, wherein the transaction information includes a temporarily assigned device identifier associated with a particular storage device corresponding to the operation.

43. A transaction indexing storage device as recited in claim 30, wherein the transaction information includes a logical address associated with the operation.

44. A transaction indexing storage device as recited in claim 30, wherein the transaction information includes a timestamp associated with the operation.

45. A transaction indexing storage device as recited in claim 30, wherein the transaction information includes context information related to the operation.

46. A transaction indexing storage device as recited in claim 45, wherein the context information includes at least one of a file name, a file type and a file size associated with the operation.

47. A transaction indexing storage device as recited in claim 45, wherein the context information includes at least one of a level of priority associated with the operation, a level of security associated with the operation and a level of power failure immunity associated with the operation.

48. A transaction indexing storage device as recited in claim 30, wherein the transaction information associated with the operation includes at least a device identifier, an operation identifier and a timestamp.

49. A transaction indexing storage device as recited in claim 30, wherein the storage device is a non-volatile storage device.

50. A transaction indexing storage device as recited in claim 49, wherein the storage device is a flash-based storage device.

51. A transaction indexing storage device as recited in claim 30, wherein the storage device can be queried by an application to provide selected stored transaction information.

52. A transaction indexing storage device as recited in claim 30 located between a host controller and a plurality of other storage devices arranged in a daisy chain configuration, wherein none of said other storage devices are located between said host controller and said transaction indexing storage device.

53. A method for storing transactions over one or more communication lines using a storage device coupled with the one or more of the communication lines, said storage device being one of a plurality of storage devices coupled with said communication lines, the method comprising:
  monitoring all operations over the communication lines by said storage device;
  receiving an operation over the communication lines at said storage device;
  determining if said operation is targeted at said storage device, and if so, performing said operation at said storage device;
  storing selected transaction information associated with the operations within a storage region of the storage device regardless of whether said operations are targeted at or performed by the storage device; and
  storing said selected transaction information associated with said operations that occur over the communication lines substantially automatically without requiring further instructions from an external host device and regardless of whether the operations are targeted at or performed by the storage device.

54. A method as recited in claim 53, wherein the storage device includes at least two storage regions, wherein a first one of the regions is reserved for storing the transaction information and wherein a separate second region is reserved for storing other data that is not transaction information.

55. A method as recited in claim 53, further comprising selectively filtering and sorting the transaction information prior to storing the transaction information.

56. A method as recited in claim 53, further comprising selectively processing the transaction information prior to storing the transaction information.

57. A method as recited in claim 53, wherein said storage device includes a counter associated with a second storage device connected with said bus, said method further comprising:
  incrementing said a counter regarding a particular element of the transaction information from said second storage device.

58. A method as recited in claim 53, further comprising utilizing the transaction information to improve memory management in the storage device.

59. A method as recited in claim 53, wherein the operations include initialization commands, authentication requests, interrupt requests, acknowledgements or error signals.

60. A method as recited in claim 53, wherein the operations include memory operations and wherein the transaction information can be associated with memory operations that occur over the communication lines.

61. A method as recited in claim 60, wherein the memory operations include read operations, write operations and erase operations.

62. A method as recited in claim 53, wherein the transaction information includes an operation identifier that identifies a type of a particular operation.

63. A method as recited in claim 53, wherein the transaction information includes a permanent device identifier associated with a particular storage device corresponding to a particular operation.

64. A method as recited in claim 53, wherein the transaction information includes a temporarily assigned device identifier associated with a particular storage device corresponding to a particular operation.

65. A method as recited in claim 53, wherein the transaction information includes a logical address associated with a particular operation.

66. A method as recited in claim 53, wherein the transaction information includes a timestamp associated with a particular operation.

67. A method as recited in claim 53, wherein the transaction information includes context information related to a particular operation.

68. A method as recited in claim 67, wherein the context information includes at least one of a file name, a file type and a file size associated with the operation.

69. A method as recited in claim 67, wherein the context information includes at least one of a level of priority associated with a particular operation, a level of security associated with a particular operation and a level of power failure immunity associated with a particular operation.

70. A method as recited in claim 53, wherein the transaction information associated with a particular operation includes at least a device identifier, an operation identifier and a timestamp.

71. A method as recited in claim 53, further comprising providing selected stored transaction information to an application in response to a query from the application.

72. A method as recited in claim 53, wherein the storage device is a dedicated storage device that is permanently coupled to one or more of the communication lines.

73. A method as recited in claim 53 wherein the plurality of storage devices are arranged in a daisy chain configuration such that each of the plurality of storage devices is connected to at least one neighboring storage device via a signal path that is separate from the communications lines, said method further comprising:
  each storage device other than the last storage device in the chain passing operations that are not targeted at itself to the next storage device in the chain via the signal path, and wherein said storage device is located in said daisy chain configuration before other of said storage devices.

* * * * *

UNITED STATES PATENT AND TRADEMARK OFFICE
CERTIFICATE OF CORRECTION

| | | |
|---|---|---|
| PATENT NO. | : 7,979,662 B2 | Page 1 of 1 |
| APPLICATION NO. | : 12/024921 | |
| DATED | : July 12, 2011 | |
| INVENTOR(S) | : Perry et al. | |

It is certified that error appears in the above-identified patent and that said Letters Patent is hereby corrected as shown below:

In the Claims:

Column 15, line 58 (Claim 57, line 5) change "said a counter" to --said counter--.

Signed and Sealed this
Sixth Day of December, 2011

David J. Kappos
*Director of the United States Patent and Trademark Office*